(12) United States Patent
Callahan et al.

(10) Patent No.: US 10,036,634 B2
(45) Date of Patent: Jul. 31, 2018

(54) X-RAY VISION AIRCRAFT LANDSCAPE CAMERA

(71) Applicant: The Boeing Company, Chicago, IL (US)

(72) Inventors: Kevin S. Callahan, Shoreline, WA (US); Richard K. Simms, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 400 days.

(21) Appl. No.: 14/876,897

(22) Filed: Oct. 7, 2015

(65) Prior Publication Data

US 2017/0102236 A1    Apr. 13, 2017

(51) Int. Cl.
  *G01C 11/12*     (2006.01)
  *G01C 11/02*     (2006.01)
  *H04N 7/18*      (2006.01)
  *G06T 7/00*      (2017.01)

(52) U.S. Cl.
  CPC ............ *G01C 11/12* (2013.01); *G06T 7/0002* (2013.01); *H04N 7/183* (2013.01); *G06T 2207/10032* (2013.01); *G06T 2207/30181* (2013.01)

(58) Field of Classification Search
  CPC .......... B64D 11/0015; G06F 17/30265; G01C 11/12; B64C 19/00
  See application file for complete search history.

(56) References Cited

U.S. PATENT DOCUMENTS

| | | | |
|---|---|---|---|
| 8,938,449 B1* | 1/2015 | Duerig | G06F 17/30265 707/723 |
| 2013/0038631 A1* | 2/2013 | DeMers | B64D 11/0015 345/633 |
| 2014/0277853 A1* | 9/2014 | Castillo-Effen | G08G 5/0095 701/3 |
| 2015/0077337 A1* | 3/2015 | Coto-Lopez | B64D 11/0015 345/156 |

* cited by examiner

*Primary Examiner* — Sathyanaraya V Perungavoor
*Assistant Examiner* — Patricia I Young
(74) *Attorney, Agent, or Firm* — MH2 Technology Law Group LLP

(57) ABSTRACT

A method for providing visual data of a landscape below an aircraft includes capturing visual data of a landscape below an aircraft, using a camera on the aircraft. The visual data is compared to previously captured visual data of the landscape. It is then determined which of the visual data and the previously captured visual data provides a clearer view of the landscape based upon the comparison. The one of the visual data and the previously captured visual data that is determined to provide the clearer view is then displayed to a user.

19 Claims, 3 Drawing Sheets

X-RAY VISION AIRCRAFT LANDSCAPE CAMERA

TECHNICAL FIELD

The present teachings relate to the field of aircraft landscape cameras and, more particularly, to systems and methods for providing a landscape view to a user from the aircraft when a visual obstruction exists between the aircraft and the landscape.

BACKGROUND

Some aircrafts currently include a camera on the exterior of the aircraft that captures visual data (e.g., pictures, videos, or both) of the landscape below the aircraft. This visual data may be viewed by passengers on the aircraft. For example, a passenger in an aisle seat may be able to view a pod of whales swimming in the sea below the aircraft by viewing the visual data on a display in the headrest of the seat in front of the passenger.

Oftentimes, however, the landscape below the aircraft is obstructed by clouds or darkness. When this occurs, the passenger is unable to view the landscape below the aircraft. What is needed, therefore, is an improved system and method that allows the user to view the landscape below the aircraft even when the landscape is obstructed by clouds or darkness.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for providing visual data of a landscape below an aircraft is disclosed. The method includes capturing visual data of a landscape below an aircraft, using a camera on the aircraft. The visual data is compared to previously captured visual data of the landscape. It is then determined which of the visual data and the previously captured visual data provides a clearer view of the landscape based upon the comparison. The one of the visual data and the previously captured visual data that is determined to provide the clearer view is then displayed to a user.

In another embodiment, the method includes capturing visual data of a landscape below an aircraft, using a camera on the aircraft. At least a portion of the landscape in the visual data is obscured. The visual data is compared to previously captured visual data of the landscape. It is determined that the previously captured visual data provides a clearer view of the landscape than the visual data based upon the comparison. The previously captured visual data is then displayed to a user.

A system for providing visual data of a landscape below an aircraft is also disclosed. The system includes a camera configured to be coupled to an aircraft. The camera is configured to capture visual data of a landscape below the aircraft. A computer system is configured to receive the visual data from the camera. The computer system is configured to compare the visual data to previously captured visual data of the landscape. The computer system is also configured to determine that the previously captured visual data provides a clearer view of the landscape than the visual data based upon the comparison.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

Figure 1:
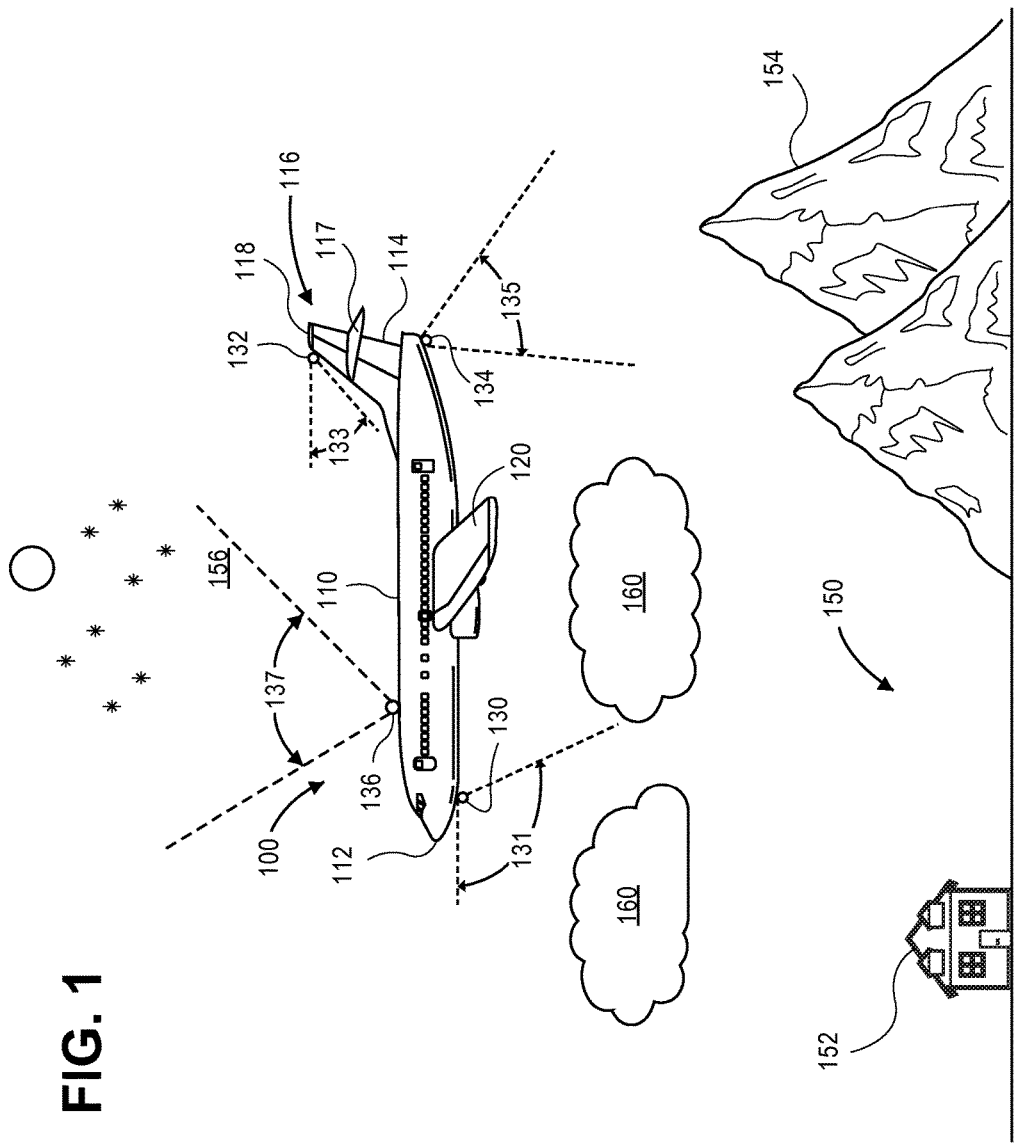
FIG. 1 is a schematic side view of an aircraft in flight, with a visual obstruction positioned between the aircraft and the landscape below, according to an embodiment.

FIG. 1 is a schematic side view of an aircraft 100 in flight, with a visual obstruction 160 positioned between the aircraft 100 and the landscape 150 below, according to an embodiment. As shown, the aircraft 100 is an airplane; however, in other embodiments, the aircraft 100 may be a helicopter, an unmanned aerial vehicle ("UAV"), a satellite, or the like. The aircraft 100 may include a body 110 having a first (e.g., front) end 112 and a second (e.g., rear) end 114. A cockpit may be positioned proximate to the first end 112. The second end 114 may include a tail 116 having a horizontal stabilizer 117 and a vertical stabilizer 118. The body 110 may also include one or more wings 120 that extend laterally therefrom.

One or more cameras (four are shown: 130, 132, 134, 136) may be coupled to and/or positioned on the exterior of the body 110. As shown, the first camera 130 may be positioned proximate to the first end 112 of the body 110. The first camera 130 may have a field of view 131 that includes directly in front of the aircraft 100 (e.g., aligned with a central longitudinal axis through the body 110), directly below the aircraft 100 (e.g., perpendicular with the central longitudinal axis through the body 110), slightly behind the aircraft 100, laterally to the sides of the aircraft 100, or a combination thereof.

The second camera 132 may be positioned proximate to the second end 114 of the body 110. More particularly, the second camera 132 may be coupled to the tail 116 (e.g., the vertical stabilizer 118). The second camera 132 may have a field of view 133 that includes directly in front of the aircraft 100, the upper surface of the aircraft 100, below the aircraft 100, laterally to the sides of the aircraft 100, or a combination thereof.

The third camera 134 may also be positioned proximate to the second end 114 of the body 110. More particularly, the third camera 134 may be coupled to the body 110 below the tail 116. The third camera 134 may have a field of view 135 that includes directly below the aircraft 100, laterally to the sides of the aircraft 100, behind the aircraft 100, or a combination thereof.

The fourth camera 136 may be positioned on an upper surface of the body 110. The fourth camera 136 may have a field of view 137 that includes above the aircraft 100. Although only four cameras 130, 132, 134, 136 are shown, it will be appreciated that more or fewer cameras may be used. For example, additional cameras may be added that include different fields of view than those shown in FIG. 1.

When the aircraft 100 is in flight, the aircraft 100 may be from about 20 meters to about 20 kilometers (or more) above the landscape 150. The landscape 150 may include land (e.g., cities, military bases, plains, forests, mountains, etc.) or water (e.g., lakes, rivers, oceans, etc.). The cameras 130, 132, 134 may be configured to capture visual data (e.g., pictures, video, or both) of the landscape 150 while the aircraft 100 is in flight. In another embodiment, the camera 136 may be configured to capture visual data of the sky 156 while the aircraft 100 is in flight. The visual data may then be provided to a user (e.g., a passenger on the aircraft 100) so that the user may view the landscape 150.

Sometimes, however, a visual obstruction 160 may prevent the cameras 130, 132, 134 from capturing clear visual data of the landscape 150. For example, the aircraft 100 may be flying at night, and the visual obstruction 160 may be darkness that prevents the cameras 130, 132, 134 from capturing clear visual data of the landscape 150. In another example, the visual obstruction 160 may be clouds, fog, or haze positioned between the aircraft 100 and the landscape 150.

Figure 2:
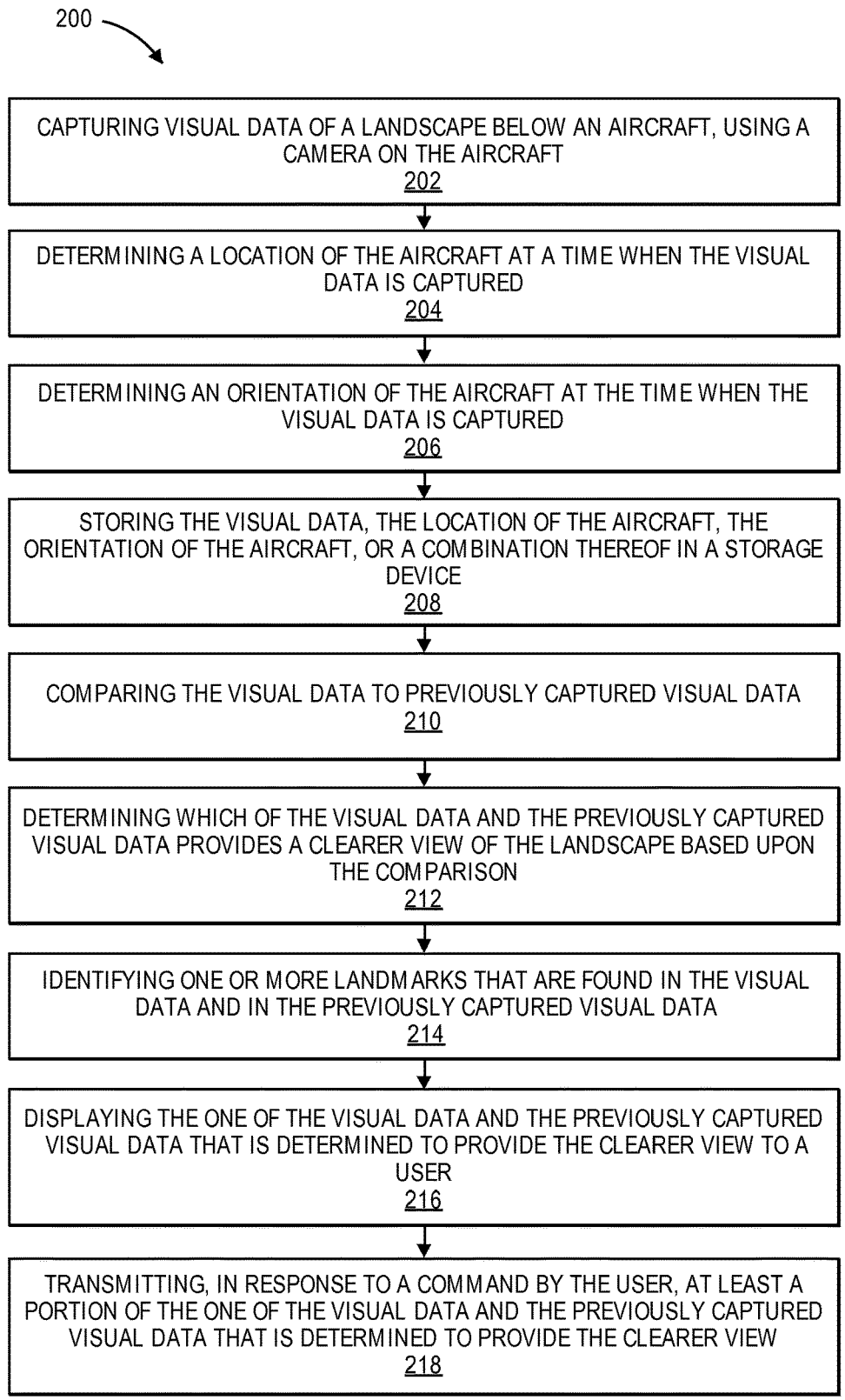
FIG. 2 is a flow chart of a method for providing visual data of the landscape below the aircraft, according to an embodiment.

FIG. 2 is a flow chart of a method 200 for providing visual data of the landscape 150 below the aircraft 100 (e.g., when the landscape 150 is obscured by a visual obstruction 160). Although method 200 refers to the landscape 150 below the aircraft 100, it will be appreciated that the method 200 may also be used to capture visual data of the sky 156 above the aircraft 100 to allow the user to view stars, planets, satellites, etc. (e.g., using the fourth camera 136).

The method 200 may include capturing visual data of a landscape 150 below an aircraft 100 (or a sky 156 above the aircraft 100), using a camera 130, 132, 134 on the aircraft 100, while the aircraft 100 is in flight, as at 202. The method 200 may also include determining a location of the aircraft 100 at a time when the visual data is captured, as at 204. The location of the aircraft 100 may include the latitude, the longitude, the altitude, or a combination thereof. The location of the aircraft 100 may be determined by a global positioning system ("GPS"), an altimeter, or a combination thereof aboard the aircraft 100. The method 200 may also include determining an orientation of the aircraft 100 at the time when the visual data is captured, as at 206. The orientation of the aircraft 100 may include the pitch, the yaw, the roll, or a combination thereof.

The method 200 may also include storing the visual data, the location of the aircraft 100, the orientation of the aircraft 100, or a combination thereof in a storage device, as at 208. The method 200 may also include comparing (e.g., using a computer system) the visual data of the landscape to previously captured visual data of the landscape, as at 210. The previously captured visual data may have been captured by the same aircraft 100 (e.g., on an earlier flight) or by a different aircraft. The previously captured visual data may also be stored in the storage device.

The previously captured visual data may have been captured from a similar location as the visual data. As used herein, the visual data and the previously captured visual data are captured from "a similar location" when the latitudes of the visual data and the previously captured visual data are within 1 kilometer of one another, the longitudes of the visual data and the previously captured visual data are within 1 kilometer of one another, and the altitudes of the visual data and the previously captured visual data are within 1 kilometer of one another.

The previously captured visual data may have been captured from an aircraft having a similar orientation as the aircraft 100 that captured the visual data. As used herein, the visual data and the previously captured visual data are captured from "a similar orientation" when the pitch of the visual data and the previously captured visual data are within 10 degrees of one another, the yaw of the visual data and the previously captured visual data are within 10 degrees of one another, and the roll of the visual data and the previously captured visual data are within 10 degrees of one another.

The method 200 may also include determining which of the visual data (captured at 202) and the previously captured visual data provides a clearer view of the landscape 150 based upon the comparison, as at 212. The one of the visual data (captured at 202) and the previously captured visual data that provides the clearer view may be the one including more light (e.g., sunlight or moonlight), fewer clouds, less fog or haze, higher resolution, or a combination thereof. For example, if the previously captured visual data is captured during the daytime and the visual data (captured at 202) is captured at night, the previously captured visual data may be determined to provide the clearer view because darkness may obscure the view of the landscape 150 in the visual data captured at night. In another example, if a visual obstruction (e.g., clouds, fog, haze, etc.) 160 at least partially obstructs the view of the landscape 150 in the previously captured visual data, and no such visual obstruction 160 (or a lesser visual obstruction 160) is present in the visual data (captured at 202), the visual data (captured at 202) may be determined to provide the clearer view because the clouds, fog, haze, etc. may obscure the view of the landscape 150 in the previously captured visual data. In yet another example, if both the visual data (captured at 202) and the previously captured visual data include similar lighting and similar visual obstructions 160, the one having the higher resolution may be determined to provide the clearer view because more details of the landscape 150 may be seen. In yet another example, if both the visual data (captured at 202) and the previously captured visual data are determined to have substantially equal clarity, then the visual data (captured at 202) may be provided to the user because it is more recent (e.g., real-time).

The method 200 may also include identifying one or more landmarks (two are shown: 152, 154) that are found in the visual data (captured at 202) and in the previously captured visual data, as at 214. The landmarks 152, 154 may be or include recognizable features in the landscape 150. As shown, the landmarks include a building 152 and a mountain 154; however, as will be appreciated, many other types of landmarks are also contemplated herein. The landmarks 152, 154 in the visual data (captured at 202) and in the previously captured visual data may be compared with one another to confirm that the locations and/or orientations of the visual data (captured at 202) and the previously captured visual data are similar, as discussed above. In addition, in some embodiments, determining which of the visual data (captured at 202) and the previously captured visual data provides a clearer view of the landscape 150 may include performing object recognition on the landmarks 152, 154 and determining which of the visual data (captured at 202) and the previously captured visual data provides a clearer view of the landmarks 152, 154.

The method 200 may also include displaying the one of the visual data (captured at 202) and the previously captured visual data that is determined to provide the clearer view to a user, as at 216. In another embodiment, the user may select (e.g., switch between) the view of the visual data (captured at 202) and the previously captured visual data. The user may also select (e.g., switch between) the views from the different cameras 130, 132, 134 to provide different viewing angles of the landscape 150. The user may also select between different algorithms to accommodate the user's viewing preferences.

The user may be a passenger on the aircraft 100. In one embodiment, the one of the visual data (captured at 202) and the previously captured visual data that is determined to provide the clearer view may be displayed on a screen that is part of the aircraft 100. For example, the screen may be in the back of the headrest of the seat in front of the passenger, in the tray table, in a virtual window or shade, or the like. In another embodiment, the one of the visual data (captured at 202) and the previously captured visual data that is determined to provide the clearer view may be transmitted wirelessly to the passenger's mobile device (e.g., smart phone, tablet, laptop, smart watch, wireless camera, etc.) where it may be displayed. In another embodiment, the user may not be aboard the aircraft 100, as discussed in greater detail below. In yet another embodiment, the visual data may be of the sky 156 and captured by the camera 136. The visual data may then be displayed on one or more panels on the ceiling of the aircraft 100 (e.g., above the passengers). The panels may be, for example, LED panels that are configured to show the current location of the stars, planets, satellites, etc. in the sky 156.

The method 200 may also include transmitting, in response to a command by the user, at least a portion of the one of the visual data (captured at 202) and the previously captured visual data that is determined to provide the clearer view, as at 218. The portion of the one of the visual data (captured at 202) and the previously captured visual data that is determined to provide the clearer view may be transmitted via text message, email, or posted to a social media site. The transmission may occur while the aircraft 100 is still in flight, or the transmission may be delayed until the aircraft 100 has landed (e.g., when the aircraft 100 is at the terminal). In at least one embodiment, the portion of the one of the visual data (captured at 202) and the previously captured visual data that is determined to provide the clearer view may be transmitted to a third party for a fee where the third party may use the visual data to update a database.

Figure 3:
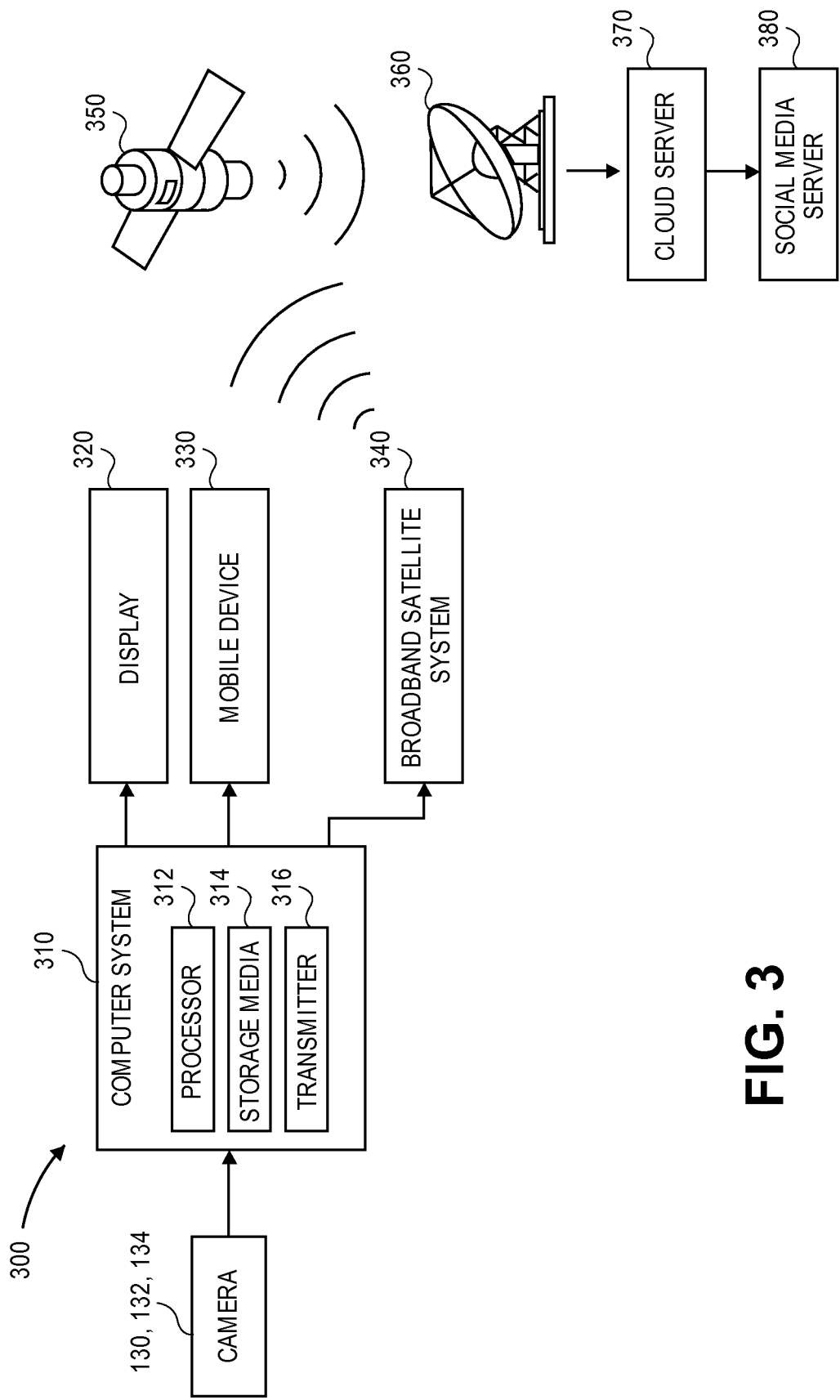
FIG. 3 is a schematic view of a system for providing visual data of the landscape below the aircraft, according to an embodiment.

FIG. 3 is a schematic view of a system 300 for providing visual data of the landscape 150 below the aircraft 100 (e.g., when the landscape 150 is obscured by a visual obstruction 160). The system 300 may include one or more of the cameras 130, 132, 134 discussed above. The system 300 may also include a computer system 310. At least a portion of the computer system 310 may be aboard the aircraft 100. The computer system 310 may include a processor 312, a storage media 314, and a transmitter 316. The visual data (and the location information, orientation information, etc.) may be received by computer system 310 and stored in the storage media 314. As mentioned above, previously captured visual data may also be stored in the storage media 314.

The computer system 310 may be configured to run a software application (e.g., an algorithm) to compare the visual data and the previously captured visual data and/or determine which provides a clearer view of the landscape 150. For example, the computer system 310 may include object recognition software that is configured to compare the visual data and the previously captured visual data and determine which provides a clearer view of the landscape 150.

In at least one embodiment, the system 300 may include a display 320 aboard the aircraft 100. For example, the display 320 may be in the back of the headrest of one of the seats, or the display 320 may be hanging down from the ceiling of the aircraft 100 (e.g., above the aisle). The computer system 310 may transmit the one of the visual data and the previously captured visual data that is determined to provide the clearer view to the display 320 for the user to see. In another embodiment, the transmitter 316 of the computer system 310 may (e.g., wirelessly) transmit the one of the visual data and the previously captured visual data that is determined to provide the clearer view to a mobile device 330 owned by the user.

The system 300 may also include a broadband satellite system 340. The broadband satellite system 340 may be positioned aboard the aircraft 100 or positioned at a ground location (i.e., offboard). When the broadband satellite system 340 is offboard, the broadband satellite system 340 may be configured to receive the one of the visual data and the previously captured visual data that is determined to provide the clearer view from the computer system 310 either wirelessly (e.g., while the aircraft 100 is in flight) or via a wired connection after the aircraft 100 has landed. The broadband satellite system 340 may be configured to transmit the one of the visual data and the previously captured visual data that is determined to provide the clearer view to a satellite 350, which may relay the signal to a ground station 360. The ground station 360 may then transmit the one of the visual data and the previously captured visual data that is determined to provide the clearer view to, for example, a cloud server 370 on the Internet. The one of the visual data and the previously captured visual data that is determined to provide the clearer view may then be transmitted from the cloud server 370 to, for example, a social media server 380.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. Finally, "exemplary" indicates the description is used as an example, rather than implying that it is an ideal. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A method for providing visual data of a landscape below an aircraft, comprising:
    capturing visual data of a landscape below an aircraft, using a camera on the aircraft;
    determining an orientation of the aircraft at a time when the visual data is captured, wherein the orientation of the aircraft comprises a pitch of the aircraft, a yaw of the aircraft, a roll of the aircraft, or a combination thereof;
    comparing the visual data to previously captured visual data of the landscape, wherein at least a portion of the landscape in the visual data or the previously captured visual data is obscured, and wherein the orientation of the aircraft at the time when the visual data is captured is within 10 degrees of the orientation of the aircraft at a time when the previously captured visual data was captured;
    determining which of the visual data and the previously captured visual data provides a clearer view of the obscured portion of the landscape based upon the comparison; and
    displaying the one of the visual data and the previously captured visual data that is determined to provide the clearer view to a user.

2. The method of claim 1, wherein the previously captured visual data was captured by the same aircraft on an earlier flight.

3. The method of claim 1, wherein the previously captured visual data was captured by a different aircraft.

4. The method of claim 1, further comprising determining a location of the aircraft at a time when the visual data is captured, wherein the location of the aircraft comprises a latitude of the aircraft, a longitude of the aircraft, an altitude of the aircraft, or a combination thereof, and wherein the latitude, the longitude, the altitude, or the combination thereof is within 1 kilometer of a location where the previously captured visual data was captured.

5. The method of claim 1, further comprising transmitting, in response to a command by the user, at least a portion of the one of the visual data and the previously captured visual data that is determined to provide the clearer view.

6. The method of claim 1, further comprising identifying one or more landmarks that are found in the visual data and in the previously captured visual data.

7. The method of claim 1, wherein the one of the visual data and the previously captured visual data that is determined to provide the clearer view includes more sunlight.

8. The method of claim 1, wherein the one of the visual data and the previously captured visual data that is determined to provide the clearer view includes fewer clouds, less fog, or less haze.

9. The method of claim 1, wherein the one of the visual data and the previously captured visual data that is determined to provide the clearer view includes a higher resolution.

10. A method for providing visual data of a landscape below an aircraft, comprising:
    capturing visual data of a landscape below an aircraft, using a camera on the aircraft, wherein at least a portion of the landscape in the visual data is obscured;
    determining an orientation of the aircraft at a time when the visual data is captured, wherein the orientation of the aircraft comprises a pitch of the aircraft, a yaw of the aircraft, a roll of the aircraft, or a combination thereof;
    comparing the visual data to previously captured visual data of the landscape, wherein the orientation of the aircraft at the time when the visual data is captured is within 10 degrees of the orientation of the aircraft at a time when the previously captured visual data was captured;
    determining that the previously captured visual data provides a clearer view of the obscured portion of the landscape than the visual data based upon the comparison; and
    displaying the previously captured visual data to a user.

11. The method of claim 10, wherein the portion of the landscape in the visual data is obscured by a cloud, a haze, fog, darkness, or a combination thereof.

12. The method of claim 11, further comprising:
    determining a location of the aircraft at a time when the visual data is captured, wherein the location is within 1 kilometer of a location where the previously captured visual data was captured.

13. The method of claim 11, wherein the previously captured visual data is determined to provide the clearer view because the previously captured visual data includes more sunlight, fewer clouds, less haze, less fog, or higher resolution than the visual data.

14. The method of claim 11, further comprising identifying one or more landmarks that are found in the visual data and in the previously captured visual data, wherein determining that the previously captured visual data provides a clearer view of the landscape than the visual data comprises determining that the previously captured visual data provides a clearer view of the one or more landmarks than the visual data.

15. A system for providing visual data of a landscape below an aircraft, comprising:
    a camera configured to be coupled to an aircraft, wherein the camera is configured to capture visual data of a landscape below the aircraft; and a computer system configured to receive the visual data from the camera, wherein the computer system is configured to:
  determine an orientation of the aircraft at a time when the visual data is captured, wherein the orientation of the aircraft comprises a pitch of the aircraft, a yaw of the aircraft, a roll of the aircraft, or a combination thereof;
  compare the visual data to previously captured visual data of the landscape, wherein at least a portion of the landscape in the visual data or the previously captured visual data is obscured, and wherein the orientation of the aircraft at the time when the visual data is captured is within 10 degrees of the orientation of the aircraft at a time when the previously captured visual data was captured; and
  determine that the previously captured visual data provides a clearer view of the obscured portion of the landscape than the visual data based upon the comparison.

16. The system of claim 15, further comprising a display configured to receive the previously captured visual data from the computer system.

17. The system of claim 16, wherein the display is part of the aircraft.

18. The system of claim 16, where in the display is a mobile device belonging to a user aboard the aircraft.

19. The system of claim 15, further comprising a broadband satellite system configured to receive the previously captured visual data from the computer system and to transmit the previously captured visual data to a server via a satellite.

* * * * *